(12) United States Patent
Zhang et al.

(10) Patent No.: US 6,295,115 B1
(45) Date of Patent: Sep. 25, 2001

(54) PRODUCING AN OPTIMIZED COLOR IMAGE FROM A NEGATIVE IMAGE AND ITS DEVELOPED PRINT IMAGE

(75) Inventors: HongJiang Zhang, Mountain View; Subutai Ahmad, Palo Alto, both of CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/260,712

(22) Filed: Mar. 1, 1999

(51) Int. Cl.[7] ............................ G03B 27/32; G03B 27/52; G03F 3/08
(52) U.S. Cl. .............................. 355/32; 355/40; 358/521
(58) Field of Search .................................. 355/32, 18, 22, 355/88.77, 40, 41, 35; 358/518–521, 448

(56) References Cited

U.S. PATENT DOCUMENTS

| | | | |
|---|---|---|---|
| 5,134,573 | * | 7/1992 | Goodwin ............................. 364/525 |
| 5,185,666 | * | 2/1993 | Capitant et al. ..................... 358/183 |
| 5,309,257 | * | 5/1994 | Bonino et al. ....................... 358/504 |
| 5,343,309 | * | 8/1994 | Roetling .............................. 358/455 |
| 5,357,354 | * | 10/1994 | Matsunawa et al. ................ 358/530 |
| 5,436,733 | * | 7/1995 | Terada et al. ....................... 358/448 |
| 5,667,944 | * | 9/1997 | Reem et al. ......................... 430/359 |
| 5,692,071 | * | 11/1997 | Govaert ............................... 382/167 |
| 5,802,217 | * | 9/1998 | Suzuki et al. ....................... 382/274 |
| 5,995,653 | * | 11/1999 | Reed et al. .......................... 382/162 |
| 6,031,641 | * | 2/2000 | Hoshino .............................. 358/521 |
| 6,038,373 | * | 3/2000 | Matsumoto et al. ................ 395/109 |
| 6,081,317 | * | 6/2000 | Nomura et al. ..................... 355/40 |
| 6,101,272 | * | 8/2000 | Noguchi .............................. 382/167 |
| 6,115,377 | * | 9/2000 | Lutz et al.l ......................... 370/391 |

* cited by examiner

*Primary Examiner*—Russell Adams
*Assistant Examiner*—Hung Henry Nguyen
(74) *Attorney, Agent, or Firm*—Thomas X. Li

(57) ABSTRACT

An image processing system for processing digitized color images is described. The image processing system includes a color matching processor that automatically produces an optimized color image from a negative image and its developed print image. The optimized color image processed by the color matching processor has the image resolution and the color appearance of the better one of the negative and the developed print. A method of automatically producing an optimized color image from a negative image and its corresponding print image is also described.

10 Claims, 4 Drawing Sheets

PRODUCING AN OPTIMIZED COLOR IMAGE FROM A NEGATIVE IMAGE AND ITS DEVELOPED PRINT IMAGE

BACKGROUND OF THE INVENTION

1. Field of the Invention

The present invention pertains to digital image processing. More particularly, this invention relates to automatically producing an optimized color image from a negative image and its corresponding developed print image.

2. Description of the Related Art

Photographic prints or print images have traditionally been used for visual presentation. The photographic prints are typically developed from negative images on a film by photo development labs or stores. The photographic prints are hereinafter referred to as "prints" and the negative images are hereinafter referred to as "negatives".

With the advances in computer technologies, it is now possible to store the prints and negatives in a computer system. This can be done using a scanner that converts the image on the print or negative into a digital image. The scanner can convert either the print into a digital print image, or the negative into a digital negative image. As is known, a digital image includes image pixels (or dots) arranged in a matrix. The data for each image pixel are then stored in a storage device of the computer system. The data for an image pixel typically include color and luminance information of that pixel. The data for an image pixel may also include other information. The digital image can be retrieved from the storage device of the computer system for imaging (e.g., to be displayed or printed). In addition, the digital image can also be digitally altered in the computer system. Moreover, the digital image can be transmitted to another computer system located at a remote site via a communication network. This also allows real time viewing of the image.

As is known, the prints typically have far better color appearance than their corresponding negatives. This is due to the fact that the photo development process of the prints typically employs a sophisticated developing process which optimizes the color appearance of the prints. The sophisticated developing process detects any color deficiency (or excessive color) on a negative and then makes appropriate color compensation on the corresponding print. On the other hand, due to the advantages of film, a negative typically has far more detail than its corresponding print. In addition, the negative also looks much sharper than its corresponding print.

However, a problem typically arises when the user wants to generate a digital image from either a negative or the corresponding print. If a print is scanned into a digital image, the resolution of the digital print image is typically not as desirable as that of the digital image produced from the corresponding negative. If a negative is scanned into a digital image, the color appearance of the digital negative image may not be as desirable as that of the digital image produced from the corresponding print, or vice versa. Furthermore, a scanned print image typically cannot be digitally enlarged without artifacts while the scanned negative image can be enlarged due to its higher resolution. However, it may be highly desirable to retain the advantages of both the negative and print.

One prior art solution to this problem is to manually correct any color deficiency contained in the negative. This is typically done using a photo-retouching tools by an expert in the field. One disadvantage of this prior art approach is that it typically requires expertise in accomplishing the work. An ordinary person does not have the skill and expertise to recognize any color deficiency or excessive color in a negative, nor does he have the expertise or skill to do the required retouching work. Another disadvantage associated with the prior art approach is that it is typically a very time consuming process and requires a great degree of patience.

Thus, there exists a need to automatically produce an optimized color image from a negative color image and its developed print image without user intervention.

SUMMARY OF THE INVENTION

One feature of the present invention is to produce an optimized color image from a color negative and its developed color print.

Another feature of the present invention is to produce an optimized color image that has the image resolution of the better one of a negative and its developed print.

A still another feature of the present invention is to produce an optimized color image that has the color appearance of the better one of the negative and the developed print from the negative.

A further feature of the present invention is to automatically produce an optimized color image from a color negative and its developed print.

An image processing system for processing digitized color images is described. The image processing system includes a color matching processor that automatically produces an optimized color image from a first image (e.g., negative) and a second image (e.g., the developed print from the negative). The optimized color image processed by the color matching processor has the image resolution and the color appearance of the better one of the two images.

A method of automatically producing an optimized color image from a negative image and its corresponding print image is also described. The method includes the step of building pixel color correspondences between the negative image and the print image such that color shift of the negative image from the print image is determined at each pixel. The method then produces the optimized color image by transforming the color distribution of the print image to the negative image at each pixel such that the optimized color image has the image resolution and the color appearance of the better one of the negative and the developed print.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
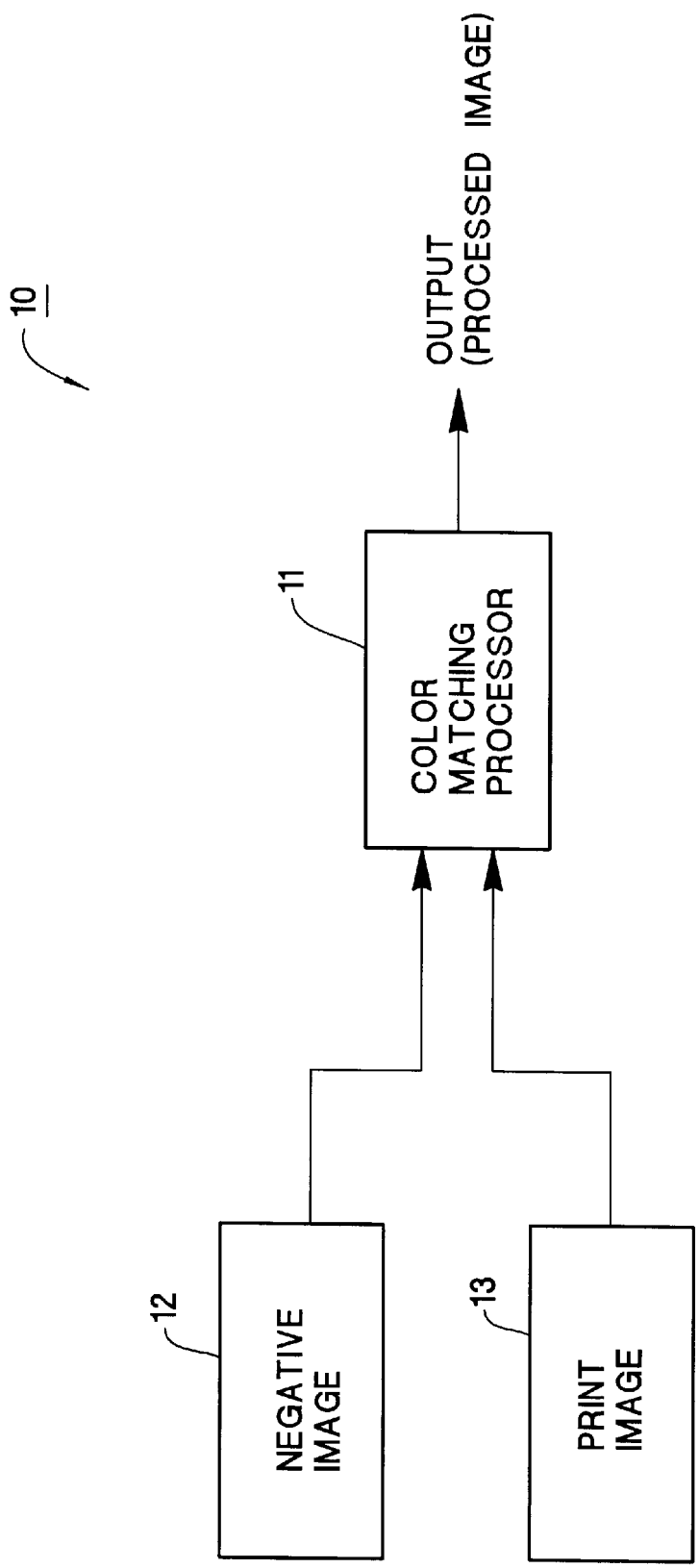
FIG. 1 shows an image processing system that includes a color matching processor in accordance with one embodiment of the present invention.

FIG. 1 shows an image processing system 10 that includes a color matching processor (i.e., the color matching processor 11) that implements one embodiment of the present invention. In accordance with one embodiment of the present invention, the color matching processor 11 automatically produces an optimized color image from a negative image and its corresponding print image such that the optimized color image processed by the color matching processor 11 has the image resolution of the negative image and the color appearance of the print image. The color matching processor 11 will be described in more detail below, also in conjunction with FIGS. 1–4.

Referring to FIG. 1, the image processing system 10 that includes the color matching processor 11 may be an image display system, a scanner/printer system, a copier system, or a computer system having a display, a printer, and/or a scanner. Thus, although only the color matching processor 11 is shown in FIG. 1 for the image processing system 10, the image processing system 10 may include additional elements or modules, such as display, printer, or other imaging devices, connected to the color matching processor 11. Moreover, the module connected to the color matching processor 11 may also be a network interface that connects the image processing system 10 to external networks (e.g., Internet or Intranet) and sends the output of the color matching processor 11 to the external networks.

The color matching processor 11 can be implemented by software, hardware, or firmware. In one embodiment, the color matching processor 11 is a software application program run on a computer system (not shown). The computer system that runs the color matching processing software of the color matching processor 11 can be a personal computer, a network computer, a mobile computer, a laptop computer, a notebook computer, a workstation computer, a server computer, a mainframe computer, a palmtop computer, or any other data processing system. In other embodiments, the color matching processor 11 can be implemented by dedicated hardware or firmware.

As can be seen from FIG. 1, the color matching processor 11 receives a negative image 12 and a print image 13. Both the negative and print images 12–13 are digitized images produced from a negative and its corresponding print, respectively, by devices (not shown in FIG. 1) of the image processing system 10. This means that each of the images 12–13 is a pixel matrix of the same image. In one embodiment, the negative image 12 can be produced by a scanner scanning through the negative, and the print image 13 can be produced by a scanner scanning through the print. The print is developed from the negative which is used to generate the negative image 12. This means that the negative image 12 and the print image 13 share the same image. Alternatively, other known means can be used to digitize the negative and print into the digital negative and print images 12–13.

As described above, a negative means a photographic image recorded on a film by a camera. The film is then developed into the negative. A print means the photographic image developed on a sheet of paper from the corresponding negative by a photo development lab or shop. Thus, the negative image 12 has far more detail that the print image 13 and looks much sharper than the print image 13. The print image 13, however, has better color appearance than the corresponding negative image 12 because the print from which the print image 13 is produced typically has undergone appropriate color compensation during the photo development process.

However, the above described is not always the case. For example, the developed print may have a higher resolution of the two images and the negative may have a better color appearance of the two images. As a further example, two print images may be used for the color matching. In this case, one of the images has better color appearance and the other has higher resolution. If the image that has better color appearance also has higher image resolution, no color matching is needed in this case. The function of the color matching processor 11 is to transform the color appearance of the better image to the image that has the worse color appearance. Once the image that has the better color appearance is identified, the color matching process is conducted automatically by the color matching processor 11.

In one embodiment, the negative image 12 is assumed to have a higher resolution and the print image 13 is assumed to have a better color appearance. In another embodiment, the user notifies the color matching processor 11 which image (either the negative image 12 or the print image 13) has the better color appearance and which image has higher resolution. In the below description, the negative image 12 is assumed to have a higher image resolution, but a worse color appearance.

Having received the negative and print images 12–13, the color matching processor 11 first manipulates the print image 13 with respect to the negative image 12 in accordance with one embodiment of the present invention. This means that the color matching processor 11 can scale, rotate, mirror, cropped, or flip the print image 13 with respect to the negative image 12. This is because that the print image 13 may be a subset of the negative image 13. Alternatively, the color matching processor 11 does not need to perform this image manipulation function.

The manipulation function of the color matching processor 11 allows the print image 13 to be in alignment with the negative image 12 such that one-to-one correspondence between the two images 12–13 can be established. As is known, when developing a print from its corresponding negative, the image from the negative may be enlarged or reduced, cropped, or rotated such that the developed print looks better.

The color matching processor 11 then performs the color matching function to automatically produce the optimized color image from the negative and print images 12–13 such that the optimized color image has the image resolution and the color appearance of the better one of the negative and print images 12–13. The color matching processor 11 solves several problems in performing the color matching function. The primary problem is that the mapping between the color distributions of the print image 13 and the negative image 12 is highly non-linear and varies significantly from image to image. In some cases, there is very little change between the images. In other cases, the Hue differences can be as high as 180 degrees. The difference also varies from color to color. A pixel with color (Hue=20, Saturation=0.3, and grey Value=0.2) may have a very different shift than a pixel with color (Hue=300, Saturation=0.8, and grey Value=0.8). Since the change is image-specific, color matching processor 11 must infer the correct mapping from the two images 12–13. This will be described in more detail below.

The primary advantage of the color matching function of the color matching processor 11 is that it makes a manual and tedious process completely automatic. The user is no longer required to be an expert and is no longer required to use complex image retouching tools to correct the colors of an image.

The color matching function of the color matching processor 11 includes two main steps. First, the color matching processor 11 performs an image or pixel registration step to find a pixel correspondence model that specifies the one-to-one relationship between the negative image 12 and the print image 13. The goal of the image registration step is to find a correspondence between pixels in the negative image 12 and pixels in the print image 13. As can be seen from FIG. 4, the pixel 41a in the negative image 12 corresponds to the pixel 42a in the print image 13. The pixel 41a has a color value of rgb (red, green, and black values) and the pixel 42a has a color value of RGB. The image registration step of the color matching processor 11 finds the correspondence between the pixels 41a and 42a. This means that the pixels 41a and 42a identify the same image spot between the images 12–13. At this step, the color matching processor 11 generates a correspondence model that stores the correspondence information of all the pixels of the images 12–13.

Once the images 12–13 are registered, the exact color shift for every color at each pixel of the negative image 12 can be computed. The registration process first computes grey scale, histogram equalized versions of the two images 12–13. Then the registration process finds a set of affine parameters that best transform the color appearance of the print image 13 into the negative image 12. For example, for the pixel 42a of the negative image 12, the color matching processor 11 computes the color shift from the rgb value of the pixel 41a to the RGB value of the pixel 42a. The color matching processor 11 then builds up a color transform (i.e., (r, g, b)=T(R, G, B)) that converts the pixel color of the pixel 42a to that of the pixel 41a.

The color matching processor 11 then performs the color correction step to produce the optimized color image (i.e., the output from the color matching processor 11). There are two different methods implemented for the color correction. The first method performs the color correction based on a global color map. The other method is a local color correction which is simpler and does not involve a color map.

The goal of the global color correction is to infer or generate a global color map that can transform the color appearance of the negative image 12 to look more like the print image 13. The color map is represented as a three dimensional HSV (i.e., Hue, Saturation, grey Value) color histogram wherein each bin contains an update vector. Since the images 12–13 are now registered, a corresponding pixel can be located in the print image 13 for each pixel of the negative image 12. Each pixel in the negative image 12 maps to one bin in the histogram. By accumulating over all the pixels, an average update vector for each relevant histogram bin can be computed.

The next step of this global color correction is to correct the negative image 12 using the color map. Here, the negative image 12 is assumed to have worse color appearance than the print image 13. Only the Hue and Saturation components of the update vector are applied for each pixel. For the grey Value component, a global scale factor is applied. This scale factor is the ratio of the average values of the print and negative images 12–13. In doing so, the local intensity variations in the negative image 12 is preserved. As is known, most of the high spatial frequency information is contained in the intensity domain. If update vectors are blindly applied to each pixel directly, the detail in the negative image 12 may be blurred.

The local color correction is simpler than the global color correction. Here, the color matching processor 11 just iterates over all the pixels in the negative image 12. For each pixel of the negative image 12, its corresponding pixel in the print image 13 is located. Then the Hue and Saturation values of each pixel in the negative image 12 are updated to match that of the corresponding pixel in the print image 13. In addition, a global scale factor is applied to the intensity value of the negative image 12. When the pixel registration have been done properly, the local color correction yields an exact color match to the print image 13. Both methods will be described in more detail below.

Figure 2:
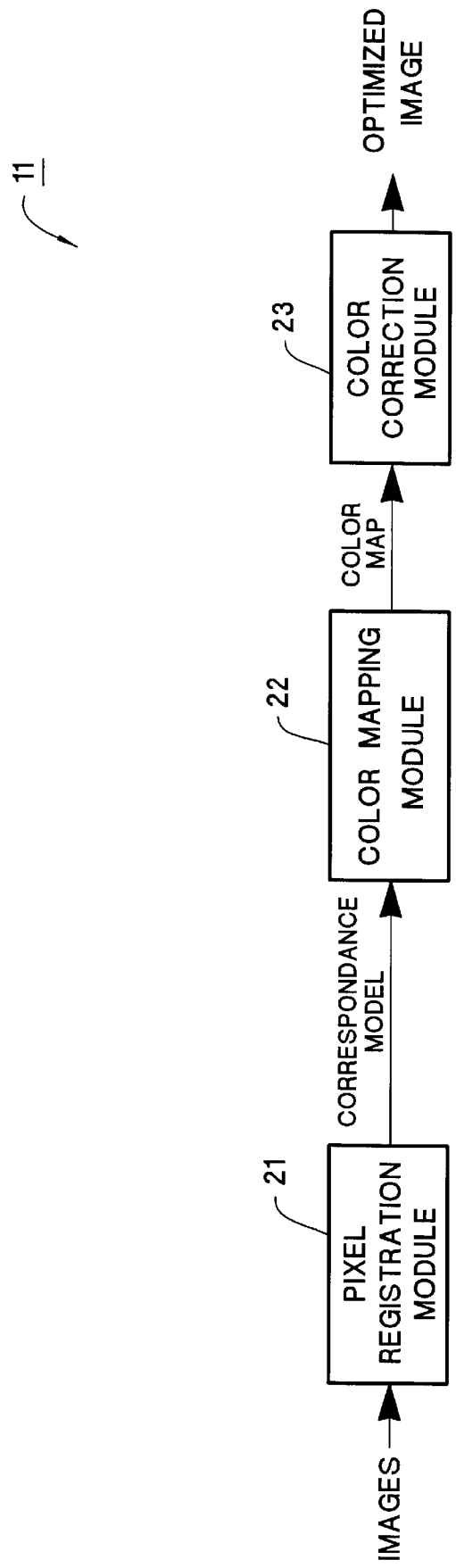
FIG. 2 shows the structure of the color matching processor of FIG. 1 which includes a pixel registration module, a color mapping module, and a color correction module.

FIG. 2 shows the functional structure of the color matching processor 11 in accordance with one embodiment of the present invention. As can be seen from FIG. 2, the color matching processor 11 includes a pixel or image registration module 21, a color mapping module 22, and a color correction module 23. The color mapping module 22 is connected to the pixel registration module 21. The color correction module 23 is connected to the color mapping module 22. The pixel registration module 21 receives the images 12–13 (shown in FIG. 1) and the output of the color correction module 23 is the optimized image.

The function of the pixel registration module 21 is to find pixel correspondences between image pixels in the negative image 12 and that in the print image 13. The pixel registration module 21 generates a correspondence model which stores the correspondence information for all the pixels of the negative and print images 12–13. The correspondence model is then applied to the color mapping module 22 of the color matching processor 11.

To find the pixel correspondence between image pixels in the negative image 12 and that in the print image 13, the pixel registration module 21 first computes the grey scale, histogram equalized versions of the two images. Then a set of affine parameters that best transform the print image 13 into the negative image 12 is calculated. The solution consists of calculating a sum square error for each pixel point using a function in six dimensions wherein each six-dimensional point of the function consists of a particular translation in x and y, scale change in x and y, and rotation in x and y. For each such point we can calculate a sum square error. The six dimensional point with minimal error corresponds to the best registration. Below is the description of the sum square error function.

Let I(x,y) be the image values at coordinate (x,y). Let:

$I_N(X,Y)$=image value of the negative image 12 at position (x,y)

$I_P(x,y)$=image value of the print image 13 at position (x,y).

Let T(x,y)=(x',y') be the affine transformation from (x,y) to (x',y').

Using homogenous coordinates, T can be expressed as a 3×3 matrix with 6 unknown parameters:

$$(X', y', 1) = \begin{bmatrix} a_{11} & a_{12} & 0 \\ a_{21} & a_{22} & 0 \\ a_{31} & a_{32} & 1 \end{bmatrix} (x, y, 1)$$

Assuming the color appearance of the print image 13 is to be transformed so that it best matches the negative image 12 during image registration. This means that in equation form, $I_N(X,Y)$ is required to be as close as possible to $I_P(T(x,y))$ for all (x,y). Casting this as a function minimization problem, we would like to find the transformation T that minimizes the sum square error by the following equation:

$$\sum_x \sum_y [I_N(x, y) - I_P(T(x, y))]^2$$

Many standard function minimization techniques can be used to find the 6 coefficients ($a_{11}$, $a_{12}$, $a_{21}$, $a_{22}$, $a_{31}$, $a_{32}$) that best minimize the above function. The Downhill Simplex search is significantly faster than using other search methods.

A tiered approach is used to fine search the best point. An initial very coarse search determines whether the image is upside down, mirrored, or flipped. Then a second search determines the likely neighborhood of the best point for the solution. A version of Downhill Simplex search is then used to locate the point with minimal error. The Downhill Simplex search is known in the art and therefore will not be described in more detail. Because of the existence of local minimum, the pixel registration module 21 needs to restart the process several times in different parts of the image matrix to increase the likelihood of locating a global minimum.

The function of the color mapping module 22 is to infer a color map that can transform the colors of the negative image 12 to look more like the print image 13. As described above, the color map is represented as a three dimensional HSV color histogram wherein each bin contains an update vector. Since the images 12–13 are now registered, a corresponding pixel can be located in the print image 13 for each pixel of the negative image 12 from the correspondence model generated by the pixel registration module 21. Each pixel in the negative image 12 maps to one bin in the histogram. By accumulating over all the pixels, an average update vector for each relevant histogram bin can be computed. The color map is then applied to the color correction module 23 for correcting the colors of the negative image 12.

The color correction module 23 performs the color correction or color transform to the negative image 12. In one embodiment, the color correction is performed using the color map generated by the color mapping module 22. This approach is referred to as the global color correction.

For global color correction, the color correction module 23 uses the color map to correct the colors of the negative image 12. Only the Hue and Saturation components of the update vector are applied for each pixel. For the grey Value component, a global scale factor is applied. This scale factor is the ratio of the average values of the print and negative images 12–13. In doing so, the local intensity variations in the negative image 12 is preserved. As is known, most of the high spatial frequency information is contained in the intensity domain. If update vectors are blindly applied to each pixel directly, the detail in the negative image 12 may be blurred.

The primary advantages of the global color correction include (1) the advantage of correcting the colors of the entire negative image 12, even those portions that fall outside of the cropped print image 13, (2) the advantage of being less sensitive to pixel registration errors since the color correction is averaged over several pixels.

In another embodiment, the color correction of the color correction module 23 is performed without using the color map. This approach is referred to as the local color correction. The local color correction approach does not require the color map inferred by the color mapping module 22. Because of this, the color matching processor 11, in one embodiment, may not include the color mapping module 22 if the local color matching approach is adopted. The local approach is also simpler than the global color correction approach.

Under the local color correction approach, the color correction module 23 just iterates over all the pixels in the negative image 12. For each pixel of the negative image 12, its corresponding pixel in the print image 13 is located from the correspondence model generated by the pixel registration module 21. Then the Hue and Saturation values of each pixel in the negative image 12 are updated to match that of the corresponding pixel in the print image 13. In addition, a global scale factor is applied to the intensity value of the negative image 12. When the pixel registration have been done properly, the local color correction yields an exact color match to the print image 13.

The primary advantages of the local color correction include (1) the advantage that the resulting optimized image is an almost perfect Hue match to the print image 13, (2) the advantage of being faster than the global correction.

Figure 3:
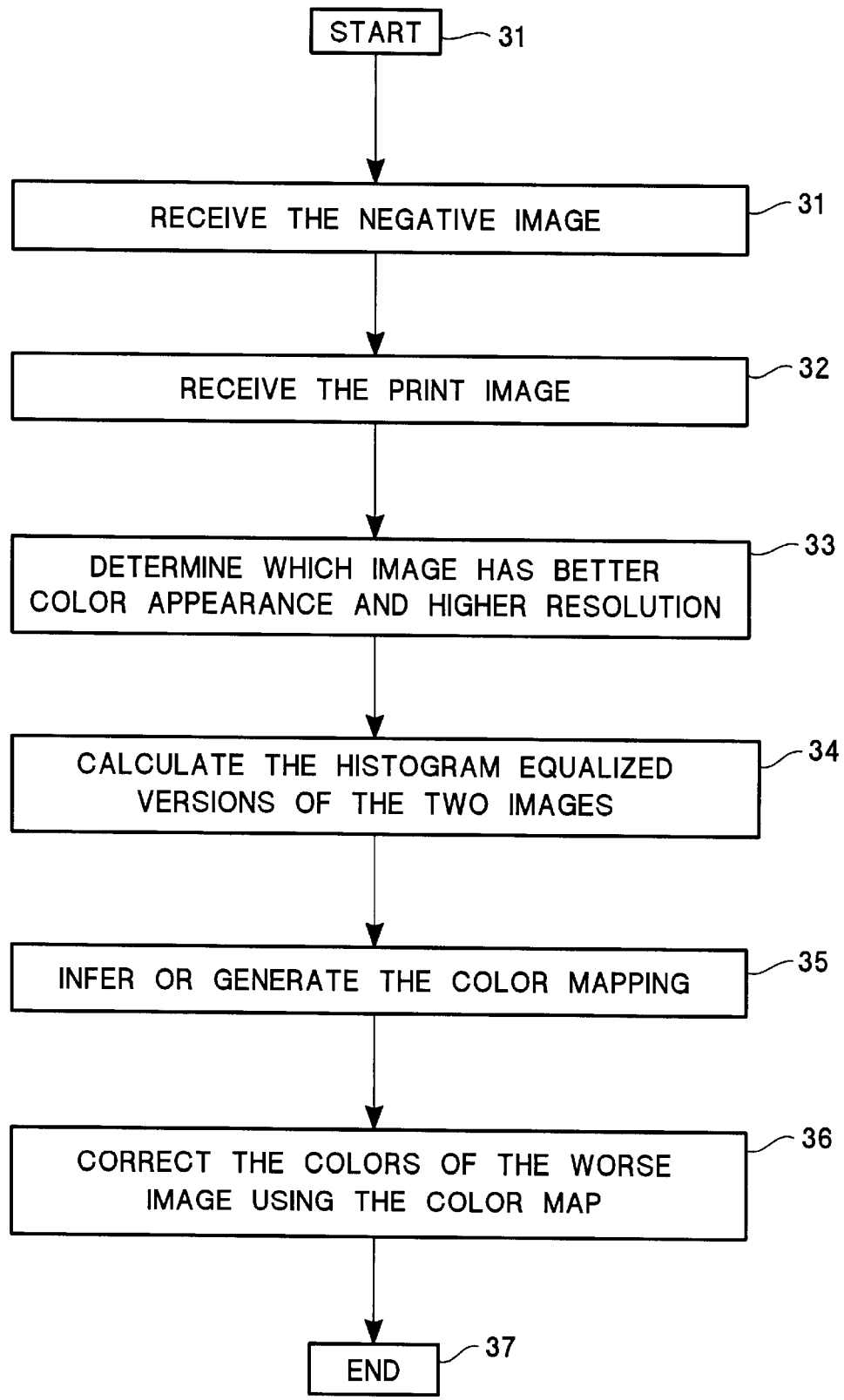
FIG. 3 is a flow chart diagram showing the process of the color matching processor of FIG. 1.
Figure 4:
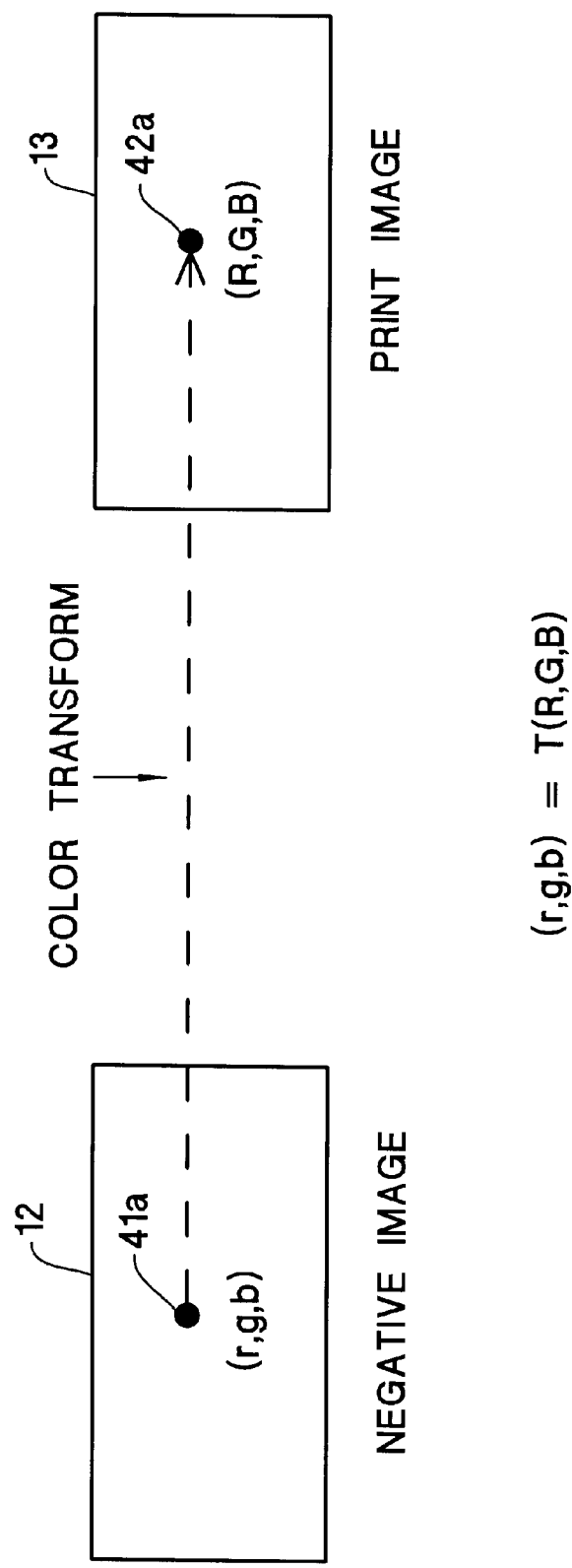
FIG. 4 illustrates how the color matching processor of FIG. 1 conducts the color transformation in accordance with one embodiment of the present invention.

FIG. 3 shows in flow chart diagram the functional steps of the color matching processor 11 of FIG. 1 in accordance with one embodiment of the present invention. As can be seen from FIG. 3, the process start at the step 30. At the step 31, the color matching processor 11 receives the negative image 12. At the step 32, the color matching processor 11 receives the print image 13. At the step 33, the color matching processor 11 calculates the histogram equalized versions of the two images. At the step 34, the color matching processor 11 learns which of the images 12–13 has better color appearance which has higher image resolution. As described above, this can either be set as the negative image 12 has higher resolution and the print image 13 has better color appearance by default, or be determined by the user. The information is fed to the color matching processor 11. At the step 35, the color matching processor 11 infer or generates the color map. This step can be skipped if the color matching processor 11 adopts the local color correction approach. The color matching processor 11 then corrects the colors of the worse image (e.g., the negative image 12) at the step 36. If the global color correction approach is used, the color matching processor 11 employs the color map to correct the colors of the negative image 12. If the local color correction approach is employed, the color matching processor 11 does not use any color map to correct the colors of the negative image 12. The process then ends at the step 37.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. An image processing system for processing digitized color images, comprising:

a color matching processor that produces an optimized color image from a negative image and its developed print image, further comprising a pixel registration module that builds pixel color correspondences between the negative image and the developed print image such that color shift between the negative image and the developed print is determined at each pixel;

a color mapping module coupled to the pixel registration module to generate a color map that can transform the colors between the negative image and the developed print image;

a color correction module coupled to the color mapping module to transform and correct colors of one of the negative image and the developed print image using the color map generated by the color mapping module.

2. The image processing system of claim 1, wherein the color map is represented as a three dimensional color histogram having a plurality of bins, each containing an update vector.

3. The image processing system of claim 1, wherein the color correction module transforms and corrects colors of the negative image globally by computing an average update vector for each bin of the color histogram;

applying the color components of the update vector of a bin to the corresponding pixel in the negative image such that details in the negative image are preserved.

4. The image processing system of claim 1, wherein the color correction module transforms and corrects colors of the negative image locally by updating the color values of each pixel of the negative image to match with that of the corresponding pixel of the print image;

applying a global scale factor to the intensity value of the negative image.

5. The image processing system of claim 1, wherein the pixel registration module builds pixel color correspondences between the negative image and the developed print image by computing a grey scale, histogram equalized version of each of the negative image and the developed print image; and determining a set of affine parameters that best transform one of the negative image and the print image into the other one of the negative image and the print image.

6. A method of producing an optimized color image from a negative image and its corresponding print image, comprising the steps of:

(A) building pixel color correspondences between the negative image and the corresponding print image such that color shift of the negative image from the corresponding print image is determined at each pixel; and (B) producing the optimized color image using the color map by transforming the color distribution of the print image to the negative image at each pixel, wherein the color map is represented as a three dimensional color histogram having a plurality of bins, each containing an update vector.

7. The method of claim 6, wherein the step (B) is performed globally by computing an average update vector for each bin of the color histogram;

applying the color components of the update vector of a bin to the corresponding pixel in the negative image such that details in the negative image are preserved.

8. The method of claim 6, wherein the step (B) is performed locally by updating the color values of each pixel of the negative image to match with that of the corresponding pixel of the corresponding print image;

applying a global scale factor to the intensity value of the negative image.

9. The method of claim 6, wherein the step (A) further comprises the steps of computing a grey scale, histogram equalized version of each of the negative image and the corresponding print image; and determining a set of affine parameters that best transform the corresponding print image into the negative image.

10. The method of claim 9, wherein the step (A) further comprises the step of generating a color map that can transform the colors of the negative image to look like the corresponding print image.

* * * * *